United States Patent
Gurdan et al.

(10) Patent No.: US 8,477,812 B2
(45) Date of Patent: Jul. 2, 2013

(54) DIGITAL MULTIMEDIA NETWORK WITH LATENCY CONTROL

(75) Inventors: Robby Gurdan, Graefenberg (DE); Richard Foss, Grahamstown (ZA)

(73) Assignees: U-MAN Universal Media Access Networks GmbH, Duesseldorf (DE); Networked Audio Solutions (Proprietary) Limited, Grahamstown (ZA)

( * ) Notice: Subject to any disclaimer, the term of this patent is extended or adjusted under 35 U.S.C. 154(b) by 374 days.

(21) Appl. No.: 12/681,208

(22) PCT Filed: Oct. 2, 2008

(86) PCT No.: PCT/EP2008/063255
§ 371 (c)(1),
(2), (4) Date: Jul. 8, 2010

(87) PCT Pub. No.: WO2009/043915
PCT Pub. Date: Apr. 9, 2009

(65) Prior Publication Data
US 2010/0290486 A1    Nov. 18, 2010

(30) Foreign Application Priority Data

Oct. 4, 2007  (EP) .................................. 07117923
Oct. 5, 2007  (EP) .................................. 07117998

(51) Int. Cl.
*H04J 3/06* (2006.01)
(52) U.S. Cl.
USPC ......................................... 370/503; 709/248

(58) Field of Classification Search
USPC ................. 370/229–235, 252, 349, 350, 394, 370/503; 709/231, 232, 235, 248
See application file for complete search history.

(56) References Cited

U.S. PATENT DOCUMENTS

| | | | |
|---|---|---|---|
| 6,381,647 B1 * | 4/2002 | Darnell et al. | 709/232 |
| 2006/0104279 A1 | 5/2006 | Fellman et al. | |
| 2010/0313176 A1 * | 12/2010 | Takahashi et al. | 716/108 |

FOREIGN PATENT DOCUMENTS

| | | |
|---|---|---|
| EP | 1122931 | 8/2001 |
| GB | 2 443 867 | 5/2008 |
| WO | 99/46937 | 9/1999 |

OTHER PUBLICATIONS

Notification of Transmittal of the International Search Report and the Written Opinion from PCT/EP2008/063255, dated Jul. 27, 2008, 13 pages.
Communication pursuant to Article 94(3) EPC from EP 07117923.8, dated Oct. 9, 2009, 1 page.

* cited by examiner

*Primary Examiner* — Kan Yuen
(74) *Attorney, Agent, or Firm* — Westman, Champlin & Kelly, P.A.

(57) ABSTRACT

The present invention relates to a digital multimedia network 1 with latency control comprising apparatuses for processing of data streams, wherein a borderline input apparatus providing a data stream generates a latency time stamp (LTS) which contains an absolute time indicating a creation time of said data stream and an accumulated delay time which is updated by each apparatus processing said data stream, wherein said latency time stamp (LTS) of said data stream is evaluated by a borderline output apparatus of said network which synchronizes said data stream.

24 Claims, 9 Drawing Sheets

Fig. 3

SMLC – data

| Data sequence ID | (SID) |
|---|---|
| Single or multi sequence marker | (SMM) |
| Latency time stamp | (LTS) |

Fig. 4

Latency time stamp (LTS)

| Absolute time | Accumulated delay time |
|---|---|

Fig. 7

CMD

| Target Device ID | Sender Device ID | Sender Parameter ID | |
|---|---|---|---|
| Sender Parameter ID (continued) | User Level | Secure PIN | |
| Message Type | Sequence ID | | |
| Command Executive | Command Qualifier | Section Block 8 bits | Section Type 8 bits |
| Channel number 24 bits | | | Parameter Block 8 bits |
| Parameter Block Index 24 bits | | | Parameter Type 16 bits |
| Parameter Type (continued) | Parameter Index 16 bits | | Value Format 8 bits |
| Value Field | | | |

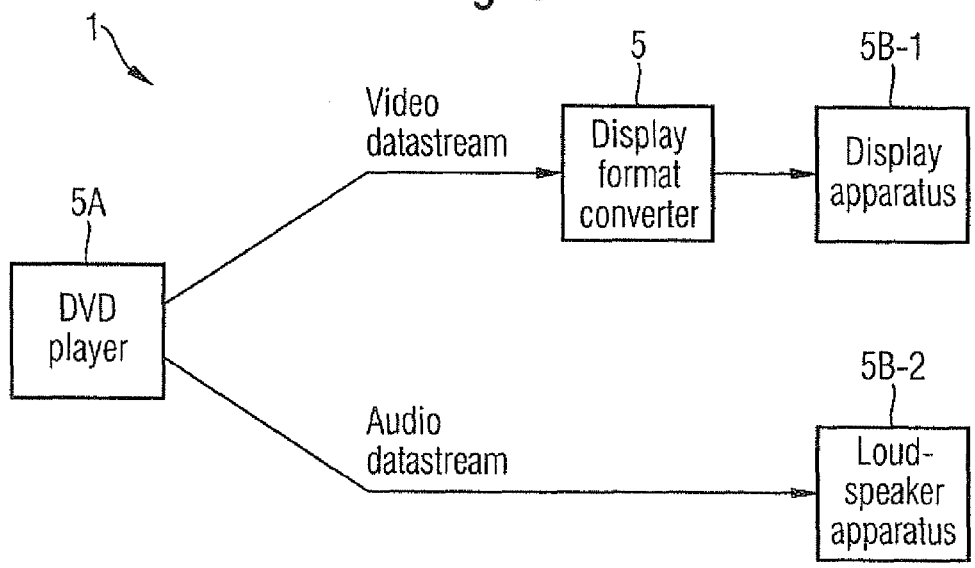

Fig. 8

DIGITAL MULTIMEDIA NETWORK WITH LATENCY CONTROL

TECHNICAL BACKGROUND

The invention relates to a digital multimedia network with latency control to synchronize data streams.

In contrast to most other industries, digital networks have not gained much footing in the audio/video industry until today. One reason for that is, that there is no adequate system for the control of latency within conventional digital multimedia networks.

Accordingly, it is an object of the present invention to provide a digital multimedia network which provides a latency control and a phase alignment of independent data streams.

SUMMARY OF THE INVENTION

The invention provides a digital multimedia network with latency control comprising apparatuses for processing of data streams, wherein a borderline input apparatus providing a data stream generates a latency time stamp which contains an absolute time of a creation time of said data stream and an accumulated delay time which is updated by each apparatus processing said data stream, wherein the latency time stamp of the data stream is evaluated by a borderline output apparatus of said network to synchronize the data stream.

The digital multimedia network according to the present invention provides a phase alignment when a number of independent multimedia data streams meet at mixing points and output points within the network. Within the digital multimedia network according to the present invention a signal latency along various signal paths from sources to these meeting points, which can be formed e.g. by mixing apparatuses or by borderline output apparatuses is accumulated and evaluated to synchronize the delayed datastreams with each other.

In an embodiment of the digital multimedia network according to the present invention an apparatus of the digital multimedia network which processes a data stream updates the latency time stamp of the data stream by adding a delay time caused by performing said processing.

When the data stream or signal is routed or processed within the digital network, every time an additional delay occurs the latency time stamp of the respective data sequence is updated by the apparatus causing the latency.

The processed data stream is an isochronous data stream comprising a corresponding latency time stamp.

In a possible embodiment the accumulated delay time of the data stream is indicated by a counter value.

In an embodiment of the digital multimedia network according to the present invention, the latency time stamp for a data stream is generated by injecting a data pattern into a data stream as an absolute time indication.

In an embodiment of the digital multimedia network according to the present invention, the injected data pattern comprises a predetermined data pattern or an altered, muted or erased data block of said data stream.

In an embodiment of the digital multimedia network according to the present invention, the latency time stamp for a data stream is generated by data stream pattern marking.

In an embodiment of the digital multimedia network according to the present invention, the counter value indicating the accumulated delay time of the latency time stamp is incremented by a processing apparatus for updating the accumulated delay time every time when a processing time corresponding to a sample time of said data stream has passed.

In an embodiment of the digital multimedia network according to the present invention, the isochronous data stream comprises data sequences each having a sequence ID (SID) which indicates a source apparatus which provides said data sequence.

In an embodiment of the digital multimedia network according to the present invention, each data sequence further comprises a single multi-sequence marker (SMM) which indicates whether the corresponding data sequence is a single data sequence provided by a single source apparatus or a multi data sequence provided by multiple source apparatuses.

In an embodiment of the digital multimedia network according to the present invention, the borderline input apparatus which provides a data stream sequence adds the data sequence ID (SID) and the simple or multi sequence marker (SMM) of the data stream sequence and the latency time stamp (LTS) to the respective data stream sequence or to a parallel isochronous data stream which has a fixed phase relation with said data stream sequence.

In an embodiment of the digital multimedia network according to the present invention, the borderline input apparatus comprises an analog to digital converter, converting an analog signal into a digital data stream.

In an embodiment of the digital multimedia network according to the present invention, the borderline input apparatus comprises a reading apparatus reading a digital data stream from a data carrier.

In an embodiment of the digital multimedia network according to the present invention, the isochronous data stream is a multimedia data stream comprising a continuous audio or video data stream.

In an embodiment of the digital multimedia network according to the present invention, the borderline output apparatus comprises a digital to analog converter which converts the data stream into an analog audio or video signal.

In an embodiment of the digital multimedia network according to the present invention, the processing apparatus comprises a mixing apparatus which delays all received data sequences to match the slowest received data sequence according to the accumulated delay times of the respective data sequences and mixes then the received data sequences to generate a mixed data sequence.

In an embodiment of the digital multimedia network according to the present invention, said data stream mixing apparatus creates a sequence ID (SID) for the generated mixed data sequence, sets the multi sequence marker (SMM) to multi and updates the latency time stamp (LTS) of the generated mixed data sequence depending on the processing time of said mixing apparatus.

In an embodiment of the digital multimedia network according to the present invention, a borderline output apparatus provided for outputting a data stream requests the latency time stamps (LTS) of all other data streams to be output by other borderline apparatuses in a synchronized manner and delays the respective data stream depending on the returned latency time stamps of the remaining data streams to be synchronized with the respective data stream.

In an embodiment of the digital multimedia network according to the present invention, said latency time stamp forms a device parameter of an apparatus provided for processing or outputting a data stream comprising said latency time stamp.

In an embodiment of the digital multimedia network according to the present invention, the digital multimedia network comprises apparatuses which communicate with each other according to a hierarchical control protocol comprising command messages each having a hierarchical parameter address which consists of parameter grouping identifiers each corresponding to a hierarchy level of a predetermined tree-structured parameter hierarchy used for addressing device parameters throughout said digital multimedia network.

In an embodiment of the digital multimedia network according to the present invention, each apparatus comprises at least one control device having a process of processing an XFN stack.

The invention provides a method for synchronizing data streams in a digital multimedia network comprising generating a latency time stamp for each data stream, wherein said latency time stamp contains an absolute time or indicating a creation time of said data stream and an accumulated delay time which is updated by each apparatus of said network processing said data stream, and delaying data streams depending on their evaluated latency time stamp to synchronize these data streams with each other.

In an embodiment of the method according to the present invention, the latency time stamps of the data streams are evaluated by a data stream mixing apparatus to synchronize data streams to be mixed.

In an embodiment of the method according to the present invention, the latency time stamps of the data streams are evaluated by at least two borderline output apparatuses which output the data streams synchronously.

In an embodiment of the method according to the present invention, the latency time stamp of a data stream is generated by a borderline input apparatus providing said data stream.

In an embodiment of the digital multi media network according to the present invention, the latency time stamp is generated by injecting a data pattern into said data stream as an absolute time indication.

In an embodiment of the digital multi media network according to the present invention, said latency time stamp or data stream is generated by data stream pattern marking.

The invention further provides a computer program comprising a structure for performing a method for synchronizing data streams in a digital multimedia network comprising generating a latency time stamp for each data stream, wherein said latency time stamp contains an absolute time indicating a creation time of said data stream and an accumulated delay time which is updated by each apparatus of the network processing said data stream and delaying data streams depending on their evaluated latency time stamp to synchronize these data streams with each other.

The invention further provides a data carrier for storing such a computer program.

BRIEF DESCRIPTION OF FIGURES

In the following preferred embodiments of the digital multimedia network with latency control, and the method for synchronizing data streams in such a digital multi media network are described with reference to the enclosed figures:

FIG. 3 shows SMLC data used for marking and latency control as employed by the digital multimedia network according to the present invention;

FIG. 4 illustrates a latency time stamp as employed by the digital multimedia network according to the present invention;

FIG. 7 shows a possible data format for a command message exchanged between apparatuses in a possible embodiment of the digital multimedia network according to the present invention;

FIG. 8 shows a simple example of a digital multimedia network according to the present invention;

DETAILED DESCRIPTION OF EMBODIMENTS

Figure 1:
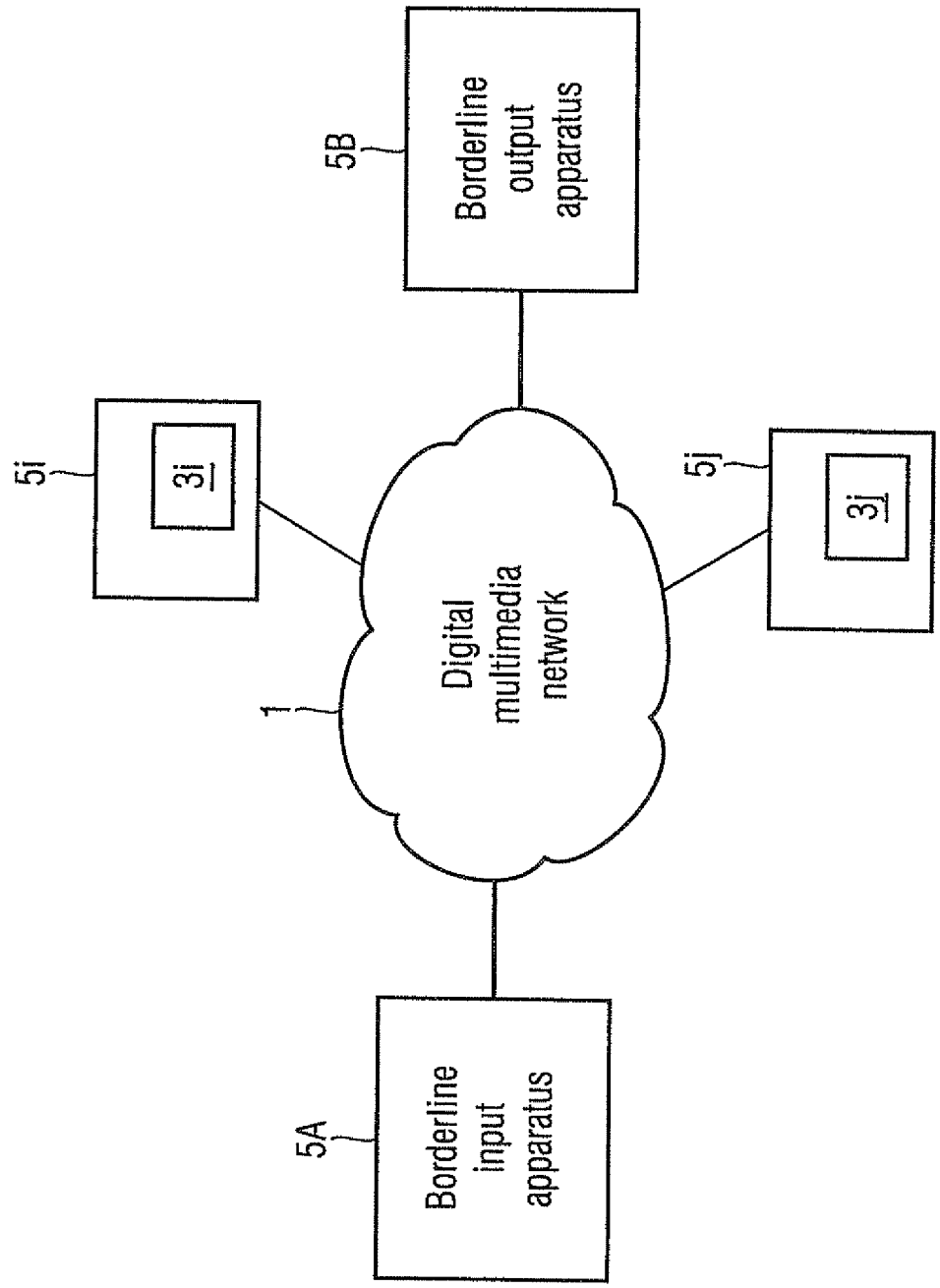
FIG. 1 shows a diagram illustrating a digital multimedia network according to the present invention.

As can be seen from FIG. 1, the digital multimedia network 1 according to the present invention has at its borderline or periphery, at least one borderline input apparatus 5A and at least one borderline output apparatus 5B. The digital multimedia network 1 shown in FIG. 1 can include a plurality of further apparatuses 5 for processing data streams provided by borderline input apparatuses 5A and supplied to borderline output apparatuses 5B.

The borderline input apparatus 5A can comprise an analog-to-digital converter converting an analog signal into a digital data stream. The borderline input apparatus 5A further can be formed by a reading apparatus reading a digital data stream from a data carrier. For example, the borderline input apparatus 5A can be a DVD or CD player generating data streams each comprising data sequences. An example of a borderline input apparatus 5A is a hard disk from which a data stream is read by a microprocessor. A further example of a borderline input apparatus 5A is an analog to digital converter converting an analog signal of a microphone into a digital audio data stream. Data streams provided by the borderline input apparatuses 5A of the network 1 are multimedia data streams such as video data streams and audio data streams.

The data streams entering the digital multimedia network 1 according to the present invention are processed by processing apparatuses 5 within the digital multimedia network 1 and forwarded to borderline output apparatuses 5B. In a possible embodiment, a borderline output apparatus 5A comprises a digital to analog converter which converts the data streams into an analog audio or video signal. For example a borderline output apparatus 5B can comprise a digital to analog converter which converts an audio data stream to an analog audio signal for a loud speaker generating an acoustic signal for a user. Another example of a borderline output apparatus 5B is a display for displaying a video signal.

Figure 2:
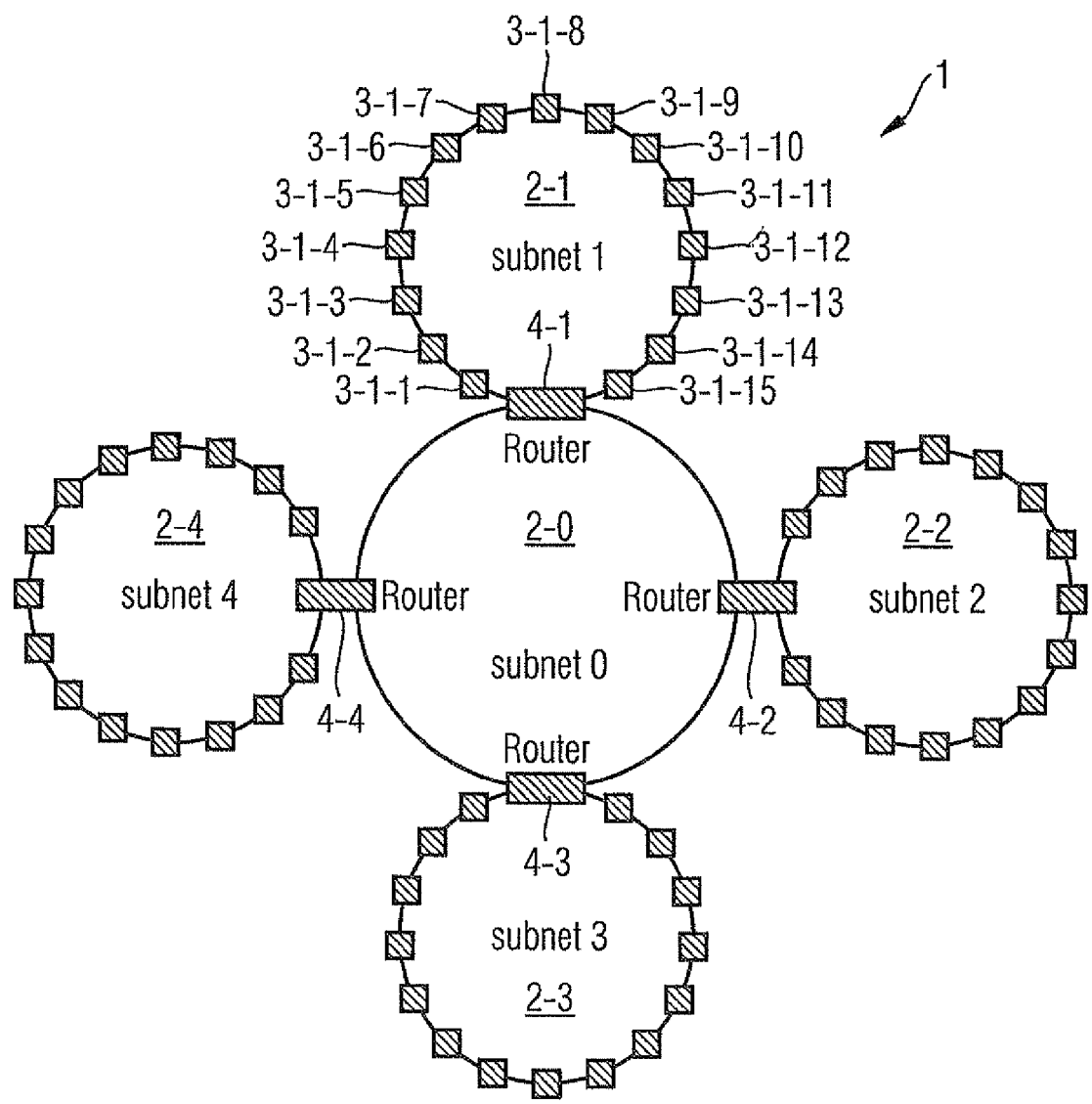
FIG. 2 shows a possible topology of a digital multimedia network according to the present invention.

FIG. 2 shows a possible topology of a digital multimedia network 1 according to the present invention. The digital multimedia network 1 according to the present invention as shown in FIG. 2 comprises a ring connection topology which is by default already redundant. In order to keep the latency consistent and low at the same time, the digital multimedia network 1 can be organized in a so called multiple ring topology. In bigger networks a middle ring of e.g. 16 routers 4 as shown in FIG. 2, forms a so called backbone 2-0 which connects all other subnets 2-*c* of the digital network 1. To each router 4 several multimedia apparatuses 5 can be connected, each having a control device 3 which can be integrated in the respective multimedia apparatus 5 or connected to the multimedia apparatus 5 via an interface. The apparatuses 5 can be any multimedia apparatuses such a mixing consoles or mixing apparatuses. The backbone concept as shown in FIG. 2 allows that many control devices 3 can be used with a global network latency from one apparatus to another apparatus being less than for example 1 ms. The backbone, i.e. subnet 2-0 as shown in FIG. 2 can be a central bus or a cluster that consists of e.g. up to 16 routers 4. Several routers 4 can be connected to an additional bus which is either again a backbone filled with routers 4 or with a ring of data streaming apparatuses 5. By using this topology it is possible to build a vast digital multimedia network 1 having a low latency.

Each control device 3 of an apparatus 5 within the digital multimedia network 1 can comprise an IP stack which is addressable via its IP address. Over the IP stack each control device 3 incorporates a hierarchical protocol layer that comprises a structured parameter address hierarchy. This parameter address hierarchy reflects a structure of the respective apparatus 5 in which the control device 3 is integrated or to which it is connected. For example, a control device 3 can be integrated in a mixing console 5 which has an input section that comprises a number of channel strips each with a number of parameter groupings which in turn contain a number of device parameters. Preferably, these parameter groupings are natural to audio engineers and are reflected in the grouping within the devices hierarchy. In a possible embodiment for any device parameter of an apparatus 5 there is a fixed number of groupings from the parameter level up to the top most tree-grouping level. In a possible embodiment, there are provided N=seven parameter grouping IDs or level IDs.

The digital multimedia network 1, as shown in FIGS. 1 and 2, can comprise a plurality of apparatuses 5 for providing, processing and outputting multimedia data streams. For example, an apparatus 5 within the digital multimedia network 1 can comprise a digital signal processor DSP for processing a data sequence. This data sequence can for example originate from a microphone. This analog audio signal is converted by an analog digital converter to provide a digital audio data stream. After processing this data stream by a digital signal processor DSP within the digital network 1, an output borderline apparatus 5B such as a loudspeaker converts by means of an integrated digital analog converter the processed data stream into an acoustical signal.

The digital multimedia network 1 performs a synchronization and phase alignment of independent digital multimedia data streams which meet at internal points, i.e. mixing apparatuses 5A and output points, i.e. borderline output apparatuses 5B. The digital multimedia network 1 according to the present invention provides a mechanism to track and accumulate latency along different signal paths from source apparatuses providing data streams to these meeting points within the digital multimedia network 1. Tracking of a signal latency along various signal paths, is done by means of latency time stamps LTS of the respective data streams.

The borderline input apparatus 5A providing a data stream generates a latency time stamp LTS which contains an absolute time indicating a creation time of said data stream and an accumulated delay time which is updated by each apparatus 5 processing this data stream within the digital multimedia network 1.

Each isochronous data stream provided by a borderline input apparatus 5A further comprises a sequence ID (SID) indicating a source apparatus from which the data stream originates. Furthermore, each data sequence further comprises a single or multi sequence marker (SMM) which indicates whether the corresponding data sequence is a single data sequence provided by a single source apparatus or a multi data sequence provided by multiple or different source apparatuses 5. The data sequence ID (SID), the single or multi sequence marker (SMM) and the latency time stamp (LTS) form sequence marking latency control data (SMLC) as shown in FIG. 3.

The data sequence ID (SID) identifies a data sequence independently from its container, e.g. an isochronous data stream. The single or multi sequence marker SMM serves multiple purposes. A single or multi sequence marker SMM can be used to trace a source apparatus to a destination apparatus. The single or multi sequence marker SMM can be formed by a flag which is set to multi to indicate that the data sequence is a mixed data sequence and originates from several mixed data sources. In this case the creating apparatus generating a data stream with this multi SMM can be queried from which source apparatuses that multi sequence originates. Furthermore, the single or multi sequence marker SMM can be used to automatically determine matching outputs or output apparatuses. A further purpose of a single or multi sequence marker SMM within the SMLC data is the provision of security. A possible scenario to crack a content protection based on data sequence SIDS, is to process a data stream in a protected environment. For example a data stream might be mixed with another data stream, wherein the mixing apparatus generates a new data sequence with a created new data sequence SID'. The data sequence output by the mixing apparatus can then be sent via a firewall comprising a black list including only the original data sequences SID. Since the created new SID' is not part of the blacklist, such a data sequence could pass the firewall unnoticed. The provision of the single or multi sequence marker SMM allows a firewall to query for the data content of a multi data stream having a single multi sequence marker SMM set to logical high and thereby discovering the real data sources of the respective data stream. By providing the single or multi sequence marker SMM, it is possible to increase security of the digital data network 1 such that data streams coming from security relevant data sources or apparatuses cannot pass a firewall apparatus unnoticed.

In the digital multimedia network 1 as shown in FIG. 1 or 2, there can be provided a plurality of apparatuses 5 for providing, processing and outputting multimedia data streams. For example an apparatus 5 within the digital multimedia network 1 can comprise a digital signal processor DSP for processing a data sequence. This data sequence can for example originate from a microphone wherein an analog audio signal has been converted by an analog digital converter to provide a audio data stream. After processing the data stream by the digital signal processor DSP within the digital network 1, an output apparatus such as a loud speaker forming borderline output apparatus 5B converts by means of an integrated digital analog converter the processed data stream into an acoustic signal.

The digital multimedia network 1 performs a synchronization and phase alignment of independent digital multimedia data streams which meet at meeting points, i.e. mixing apparatuses 5 and output points, i.e. borderline output apparatuses 5B. The digital multimedia network 1 according to the present invention provides a mechanism to track and accumulate latency along different signal paths from source apparatuses providing data streams to these meeting points within the digital multimedia network 1. Tracking of latency along various signal paths is done by means of a latency time stamp LTS with which the respective data stream is labeled.

The latency time stamp LTS as shown in FIG. 4 forms part of the SMLC information data illustrated in FIG. 3. The latency time stamp LTS as shown in FIG. 4 comprises an absolute time indicating a creation time of the respective data stream and an accumulated delay time which can be updated by each apparatus 5 within the network 1 which processes the respective data stream provided with the latency time stamp LTS. In a possible embodiment, the accumulated delay time can be indicated by counter value. In a further possible embodiment, the latency time stamp LTS of a data stream is generated by a borderline input apparatus 5A by injecting a data pattern into the respective data stream as an absolute time indication. The injected data pattern can comprise a predetermined data pattern or an altered, muted or erased data block of the respective data stream. In an alternative embodiment a latency time stamp LTS of data stream can be generated by data stream pattern marking. This is explained later with reference to FIGS. 10A to 10E.

In a possible embodiment, the counter value indicating the accumulated delay time of the latency time stamp LTS as shown in FIG. 4 can be incremented by any processing apparatus 5 by updating the accumulated delay time every time when a processing time corresponding to a sample time of the respective data stream has passed. The latency time stamp LTS indicates the timing information of the borderline input apparatus in samples or as accumulated time.

Figure 5A:
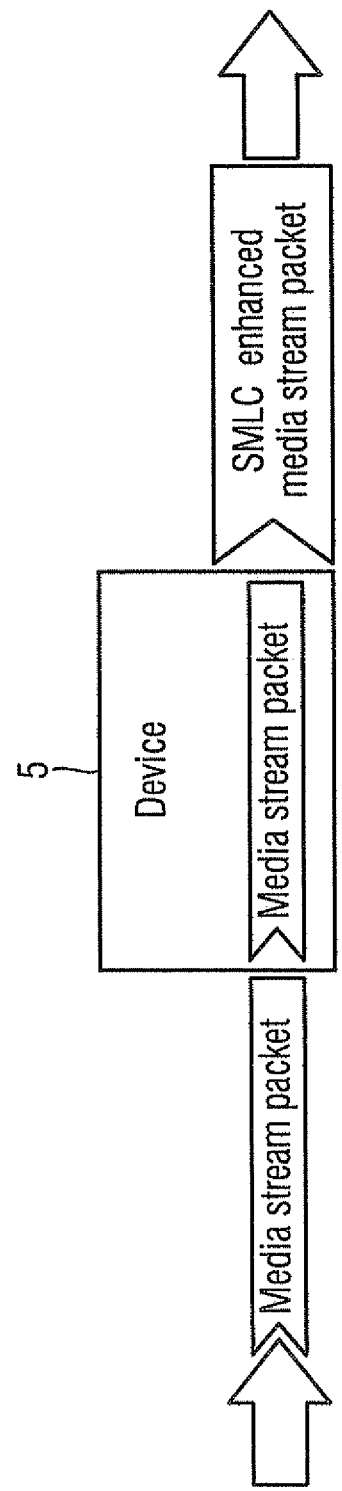
FIGS. 5A, 5B show variants for the insertion of SMLC data as employed by the digital multimedia network according to the present invention.
Figure 5B:
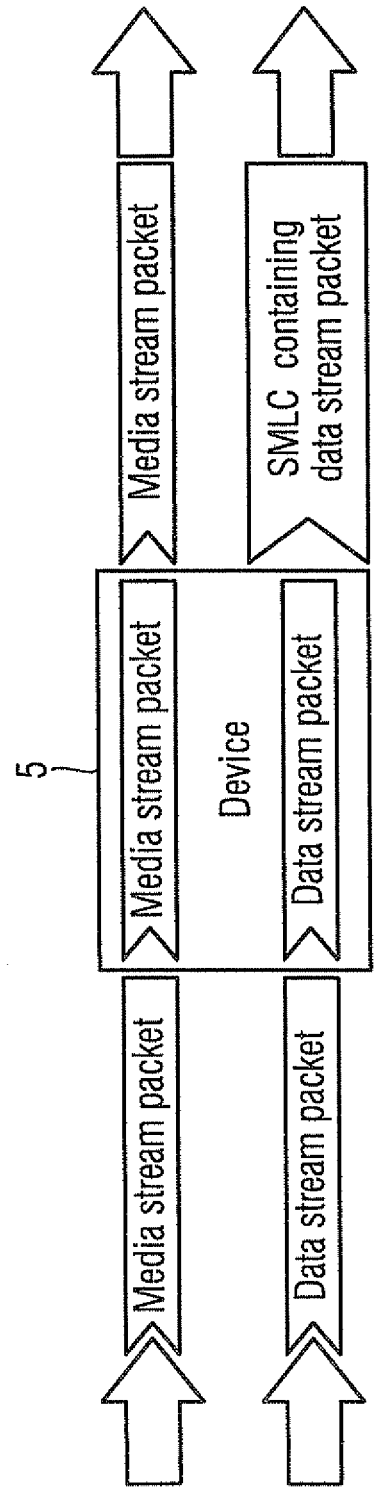

There are two alternatives to add the SMLC information data. In a dynamic approach, the SMLC information data shown in FIG. 3 is added dynamically within a data stream. In an alternative embodiment, the SMLC information data is added statically as part of data stream control parameters. FIGS. 5A, 5B show two variants for adding dynamically SMLC data to a data stream. A data sequence is created by an apparatus such as a borderline input matrix which generates the SMLC information data in addition to the data content and adds it either to the data sequence itself or to a related data stream.

As shown in the variant of FIG. 5A, the SMLC data is inserted by the generating apparatus into the multi media data stream directly.

In the variant as shown in FIG. 5B, the SMLC data is inserted by the generating apparatus into a parallel data stream. In this variant the apparatus generating the data stream adds the SMLC information to a parallel sequence within an isochronous data stream having a fixed phase relationship with the respective data stream sequence. In the case of an analog-to-digital converter which forms a borderline input apparatus 5A, the created latency time stamp LTS contains an absolute time of the moment when the data stream packet or data stream is created. Because the data stream is generated by this analog to digital converter as a borderline input apparatus 5A, and no accumulated delay by passing through the digital network 1 has occurred, the offset of the latency time stamp LTS is set initially to 0 samples. A generated data stream and its latency time stamp LTS can be routed through the digital network 1 by means of routers 4, and be processed by processing apparatuses 5 within the digital multimedia network 1. The offset part of the latency time stamp LTS of the data sequence is then updated at any apparatus 5 causing an additional latency or delay. A delay can be caused by routing through a router 4 or by processing the data stream by a processing apparatus 5 of the network 1. For example, if a digital signal processor DSP as a processing apparatus 5 within the network 1, needs a processing time corresponding to 120 data samples it adds 120 samples to the LTS offset, i.e. the accumulated delay time counter is increased by a value of 120. A value of 120 is added to the LTS offset provided by the borderline input matrix and the updated offset is provided to the next apparatus. The processing apparatus or the router causing the delay by processing or routing do not change the absolute time of the latency time stamp LTS of the respective data stream.

An offset processing, i.e. change of the accumulated delay time of a latency time stamp LTS, is done by every processing apparatus 5 or any router 4 within the digital multimedia network 1, except for apparatuses 5 that are meant to cause some time shift such as a delay apparatus. In case of such apparatuses or units, the latency of the unprocessed signal between the input of the input borderline matrix to the output of the output borderline matrix is added to the accumulated delay time of the latency time stamp LTS.

Within a static approach, each data sequence of each multicore comprises SMLC information data associated with it. If a controller connects an output multicore of one apparatus to an input multicore of another apparatus it is the responsibility of this controller to copy SMLC data from the output multicore parameters to the input multicore parameters, updating the latency time stamp LTS offset appropriately.

Figure 6:
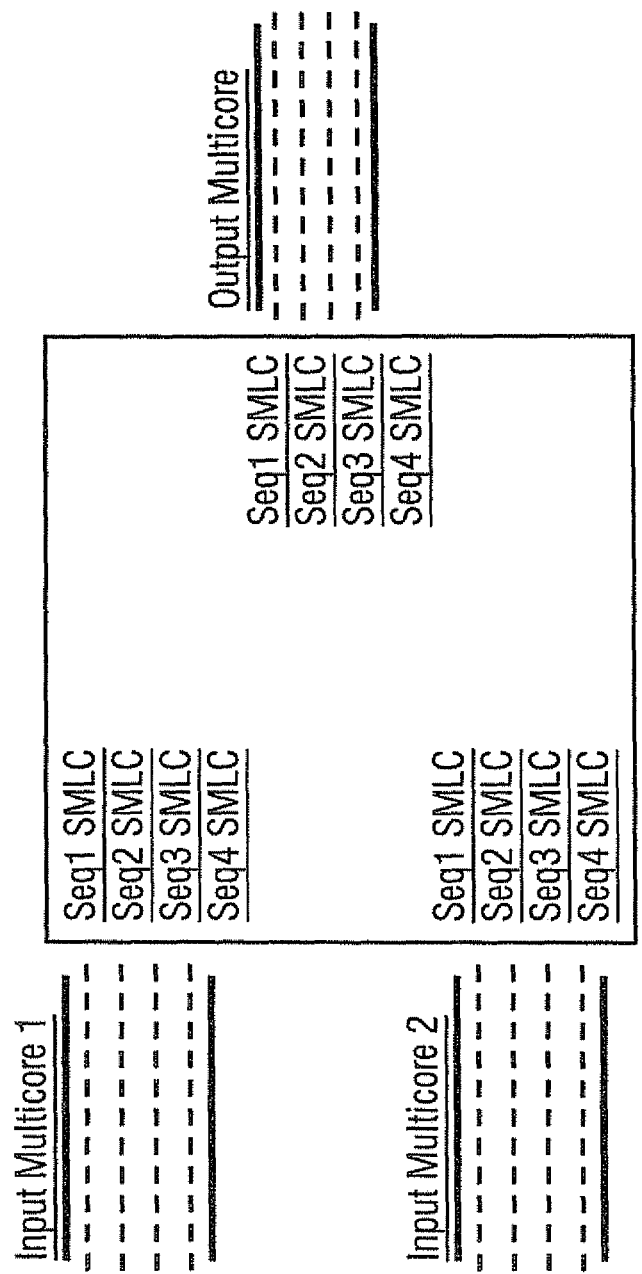
FIG. 6 shows a diagram for illustrating the association of SMLC data to sequences as employed by the digital multimedia network according to the present invention.

FIG. 6 shows a diagram, wherein SMLC data is associated with each data sequence of each multicore. It is the responsibility of the apparatus to set its output multicore parameters, given that it knows its internal routings and the delays associated with these routings. A router 4 can perform a routing of isochronous data streams from transmit apparatuses connected to the router 4 by means of a transmitting network section to receiving apparatuses connected to the router 4 via at least one receiving network section of the digital multimedia network 1. In a possible embodiment, a router 4 can rebundle isochronous data streams received from the transmitting apparatuses to optimize a band width of the receiving network section or to optimize a data stream processing capacity of the receiving apparatuses.

Each isochronous data stream can comprise a header (iso header) and several data sequences. For example, an isochronous header stream can comprise several audio data streams. Samples from each data block form part of the data sequence. In a possible embodiment time slots having a constant time length of e.g. 125 ms, are each divided into a part for asynchronous data transmission or messaging and a part reserved for isochronous data transmission. Within the period of the time slot reserved for asynchronous data transmission, control data packets or command messages CMD can be exchanged between the apparatuses 5 of the digital multimedia network 1. In the time reserved for isochronous data transmission, synchronous data packets can be transmitted. An isochronous data packet comprises a header including a channel number and an identifier of the node transmitting the respective isochronous data packets. Further information such as data block size, and a value that indicates the number of fractions into which the original data packet is divided can also form part of the header of such an isochronous data packet. For example if a node or apparatus of the network transmits an isochronous data packet every 125 ms this corresponds to a transmission rate of 8000 data packets per second. An isochronous data stream comprises a continuous flow of data packets wherein each data packet comprises data blocks. The data stream comprises a number of data sequences wherein each data sequence corresponds to a particular data block position.

FIG. 7 shows an example for a data format of a command message, exchanged between apparatus 5 of the digital multimedia network 1, wherein each apparatus 5 comprises a control device 3 processing such a command message. A command message can access a parameter controlled by a control device 3 within an apparatus 5 by providing a hierarchical parameter address HPA, indicating a position of the device parameter within the respective apparatus 5 and thereby allows access to it. These control devices 3 of an apparatus 5 within the digital multimedia network 1 can implement an XFN stack that parses such a command message structure and is able to locate the respective device parameter. A command message CMD as shown in FIG. 7 can be contained within the data area of a UDP datagram. An UDP header and data area can in turn be contained within the data area of an IP datagram.

The primary purpose of a command and control message CMD such as shown in FIG. 7 is to get and set the various parameters of apparatuses 5 and by doing so to control the various capabilities of these apparatuses 5. Usually, each control device 3 within the digital multimedia network 1 is uniquely addressed via an IP address.

Further, it may happen that a control device 3 incorporates a number of units that function as complete devices or that a PC acts as a proxy for a number of non-XFN devices. In such cases one can send a target device ID contained in a command message CMD as shown in FIG. 7 used to distinguish the individual control devices of the same IP address.

Every device parameter within a control device 3 has a unique parameter ID. For example a gain parameter on a mixing console 5 has a unique parameter ID and a graphic slider on a work station has a unique parameter ID. A command message CMD can be generated and transmitted to a destination parameter of a receiving target apparatus due to a change of a source parameter of a sending (source) apparatus. Then the parameter ID indicates the destination parameter.

A user level allows a device parameter to know the user level of a user who submitted a command via command message CMD.

Furthermore, a secured PIN mechanism provides an access control over device parameters. This can be useful, for example, when command messages CMD control a routing of audio or video data streams that contain sensitive information. In this case, the PIN as shown in FIG. 7 of the command message CMD, accompanies the command message and can be used to determine whether both apparatuses have the appropriate access rights.

The message type field shown in FIG. 7 indicates the nature of the command message CMD. Some command messages CMD are requests and others form responses. The command messages CMD contains detailed hierarchical information data to describe a device parameter. If a source apparatus transmits a large number of command messages CMD it does not wait for the immediate response and therefore it must be able to identify responses from other apparatuses. This can be reached by providing a sequence ID within a command message as shown in FIG. 7.

Every command message CMD contains a command executive together with an indication (via hierarchical parameter address) of the device parameter or group of device parameters that the command messages CMD relates to. The command executive component of a command message CMD indicates the fundamental nature of the command such as get or set etc.

A command qualifier allows the command executive to be directed to a particular attribute of a device parameter, or a particular grouping of device parameters.

Besides the header data the command message CMD, shown in FIG. 7, comprises a so called data block which provides the address of a target device parameter of a target apparatus in an N-level hierarchical format. The hierarchical structure enables group of device parameters to be addressed with a single command message CMD. In the embodiment shown in FIG. 7, seven hierarchy levels are provided, i.e. a section block, a section type, a channel number, a parameter block, a parameter block index, a parameter type and a parameter index. Further a value format and a value field for storing a parameter value of the respective device parameter is provided.

In a possible embodiment, each apparatus 5 of the digital multimedia network 1 according to the present invention can comprise at least one control device 3 having a processor for processing an XFN-stack and in particular a command message CMD as shown in FIG. 7.

Besides an exchange of command messages in an asynchronous manner by asynchronous data streams, continuous or audio data streams are generated, forwarded, processed and output by multimedia apparatuses 5 of the digital multimedia network 1.

Latency time stamps LTS of the data streams are processed in two scenarios.

The first scenario where a latency time stamp LTS is processed is when two or more data sequences leave the realm of the digital multimedia network 1 which is done usually at a digital to analog converter forming a borderline output apparatus 5B.

The other occasion when a latency time stamp LTS is processed is when two or more data sequences are mixed together by a mixing apparatus.

In both cases the latency time stamp LTS is evaluated to delay the faster signals or data sequences sufficiently so that they match the latency of the slowest signal or data sequence. In the resulting data sequence, the latency time stamp of the slowest signal is used as the input LTS and the latency caused by the respective apparatus is added to the accumulated delay time of the latency time stamp LTS.

A mixing apparatus delays all received data sequences to be mixed to match the slowest received data sequence according to the accumulated delay times of the respective data sequences and mixes then the received data sequences to generate a mixed data sequence, i.e. a new mixed data sequence. A data stream mixing apparatus creates a sequence ID for the generated mixed data sequence and sets the multi sequence marker SMM of the generated mixed data sequence to multi. Furthermore, the data stream mixing apparatus updates the latency time stamp LTS of the generated mixed data sequence depending on the processing time for performing this mixing of signals.

FIG. 8 shows a simple example of a digital multimedia network 1 according to the present invention and illustrates a latency control. In the given example, the digital multimedia network 1 comprises a DVD player as a borderline input apparatus 5A and two separate borderline output apparatuses 5B-1,5B-2. A first borderline output apparatus 5B-1 is formed by a display apparatus and the second borderline output apparatus 5B-2 is formed by a loudspeaker. The DVD player 5A reads a video data stream and audio data stream from a data carrier such as a DVD. In the given example, the audio data stream is forwarded directly to the loudspeaker apparatus 5B-2. Because of the hardware of the display apparatus 5B-1, in the given example, the video data stream provided by the DVD player 5A needs a data format conversion. For example, an HD video data stream is transformed into an SD video data stream. For this format conversion a display format converter 5 as an apparatus of the digital multimedia network 1 is provided. The format conversion of the video data stream by the display format converter 5 takes some time so that it is necessary to synchronize the audio data stream forwarded to the loudspeaker 5B-2 with the video data stream delayed by the display format converter 5 and output by the display apparatus 5B-1. The DVD player 5A includes SMLC data, in particular a latency time stamp LTS to the respective data streams, i.e. into the video data stream and into the audio data stream. The offset value of the latency time stamp LTS of the video data stream is updated by the processing apparatus 5, i.e. the display format converter. The display format converter 5 adds the necessary processing time to accumulated delay time of the latency time stamp LTS of the video data stream. In a possible embodiment, a counter value indicating the accumulated delay time of the latency time stamp LTS is incremented by the processing apparatus 5 for updating the accumulated delay time every time when a processing time corresponding to a sample time of the data stream has passed. For example, the display format converter 5 as shown in FIG. 8 adds a value of eight to the accumulated delay time of the video data stream if the necessary processing time for data conversion has the length of eight data samples. The delayed video data stream with the updated latency time stamp LTS is received by the display 5B-1. The display apparatus 5B-1 evaluates the latency time stamp LTS to synchronize this data stream with the audio data stream output by the audio apparatus 5B-2. The audio apparatus 5B-2 forming the other borderline output apparatus of the network 1 evaluates the latency time stamp LTS of the received audio data stream to synchronize it with the video data stream. The latency time stamps LTS of both signals are used to delay the faster signal so long, that it matches the latency of the slower signal. In this case, as shown in FIG. 8, the faster audio data stream is delayed, such that it matches the latency of the slower video data stream which has been delayed by the display format converter 5. The audio data stream in the given example is delayed by the loudspeaker apparatus 5B-2 for at least eight data samples before outputting the analog signal. In this manner, a user looking at a movie played by the DVD player 5A receives the video and the audio signal in a synchronous manner.

Figure 9:
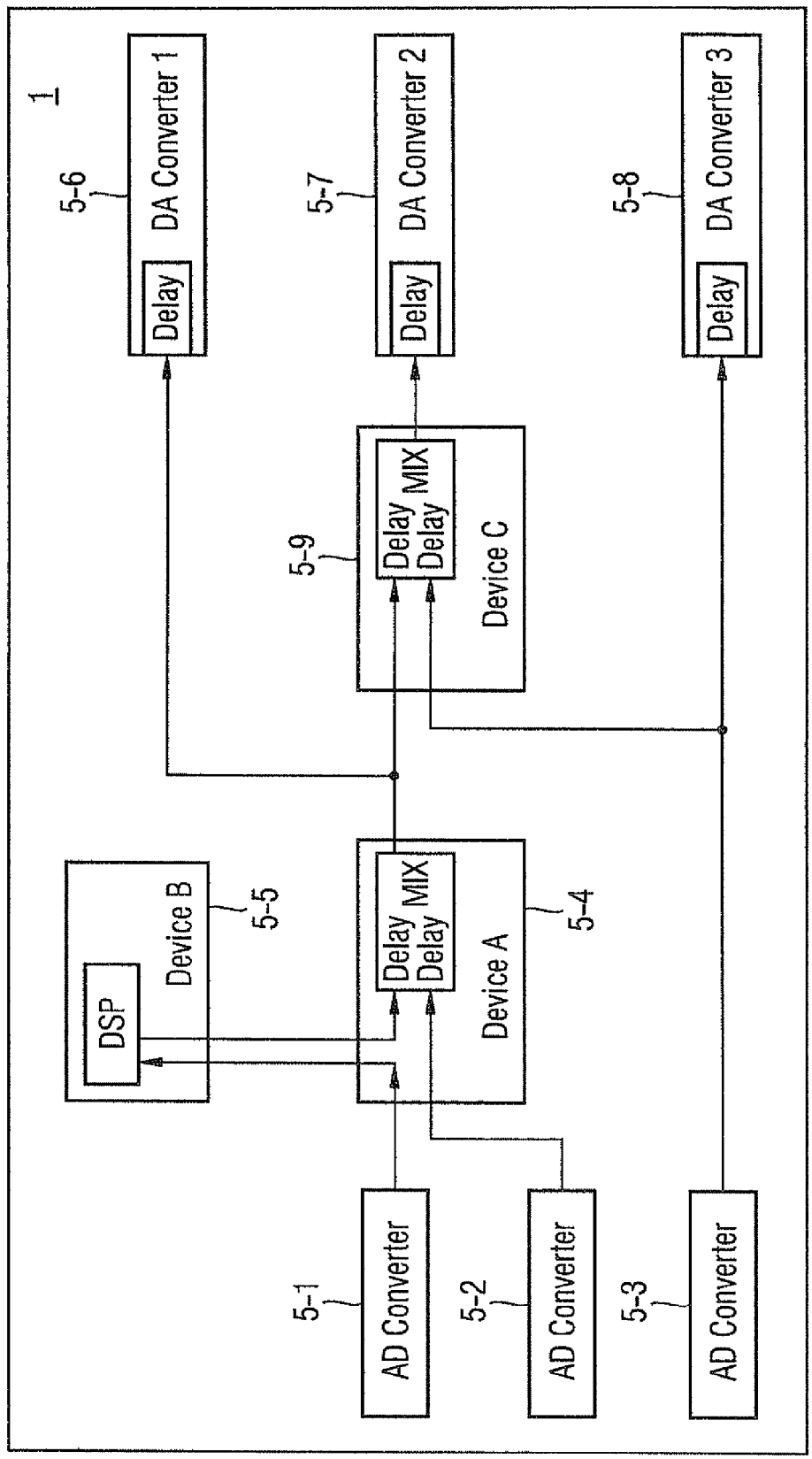
FIG. 9 shows a further example of a digital multimedia network according to the present invention.

FIG. 9 shows a further example of a digital multimedia network 1 according to the present invention illustrating the latency control. In the given example, the digital converter generates as a first borderline input apparatus 5-1 a data sequence with a sequence ID SID1 and adds a corresponding latency time stamp LTS to the generated data sequence. Furthermore, the analog digital converter 5-1 sets the SMM of the generated data sequence SID1 to single.

A second analog digital converter 5-2 creates a second data sequence having a data sequence ID SID2. The apparatus 5-2 adds a latency time stamp LTS to the generated data sequence and sets the SMM of this data sequence also to single.

In the network 1 as shown in FIG. 9, a third analog digital converter 5-3 creates a third data sequence having a sequence ID SID3 that includes a latency time stamp LTS in the generated data sequence and sets the respective sequence SMM to single.

An apparatus 5-4 that is in the given example sends an 'insert send' sequence to an apparatus 5-5 comprising a digital signal processor DSP. The apparatus 5-4 updates the latency time stamp LTS of the first data sequence received from the analog digital converter 5-1. Apparatus 5-5 sends to apparatus 5-4 an insert return data sequence with a sequence ID SID1 and updates the latency time stamp LTS of this data sequence.

Apparatus 5-4 delays the second data sequence SID2 to match the first data sequence processed by the digital signal processor DSP of apparatus 5-5. Furthermore, the apparatus 5-4 mixes the first data sequence and the second data sequence creating a further data sequence with a new sequence ID SID4. The mixing apparatus 5-4 sets the multi sequence marker SMM of the generated mixed data sequence SID4 to multi. The mixing apparatus 5-4 updates the latency time stamp LTS of the generated mixed data sequence depending on the processing time of the mixing apparatus. In the given example, the latency time stamp LTS is updated by adding the internal processing time of the mixing apparatus.

A digital to analog converter 5-6 which forms a borderline output apparatus requests the latency time stamps LTS of all matched apparatuses, i.e. digital analog converter 5-7 and 5-8. The digital to analog converter 5-6 evaluates the received latency time stamps LTS of the output signals to be synchronized.

In the given example of FIG. 9, further, apparatus 5-9 forms also a mixing apparatus which receives a data stream from the analog digital converter 5-3 and the mixed data sequence from the other mixing apparatus 5-4, having the sequence SID=4. The mixing apparatus 5-9 matches the delays of the received data sequence SID3 to match the mixed data sequence SID4. Mixing apparatus 5-9 uses the higher latency time stamp LTS, in this case of the data sequence SID4 and adds its processing time. The mixing apparatus 5-9 generates a further data sequence with a new sequence SID5 and sets the SMM of the generated data sequence to multi.

The digital analog converter 5-7 requests the latency time stamp LTS of all other apparatuses to be matched with, i.e. digital analog converters 5-6 and 5-8 and outputs as a signal directly the data sequence with the SID5, received from mixing apparatus 5-9 being the most delayed data sequence. The digital to analog converter 5-8 also requests the latency time stamps LTS of all remaining matching systems, i.e. digital analog converter 5-6, 5-7 and delays the respective signal.

In a possible embodiment, a latency time stamp LTS forms a device parameter of an apparatus 5 within the network 1. This device parameter can be controlled by a control command message CMD as shown in FIG. 7.

In a possible embodiment the latency time stamp LTS for a data stream is generated by injecting a data pattern into the respective data stream as an absolute time indication. This injected data pattern can comprise a predetermined data pattern or an altered, muted or erased data block of the data stream. In almost any data stream, it is possible to erase some content for a defined time from the data stream. This empty space can be used to indicate a certain absolute time of the same content and after this synchronizity once has been achieved it can be substained by counting samples of this data stream.

In a preferred embodiment a latency time stamp LTS for a data stream is generated by data stream pattern marking, which is explained with reference to FIGS. 10A to 10E. A data stream pattern marking does not alter the content of the data stream.

Figure 10A:
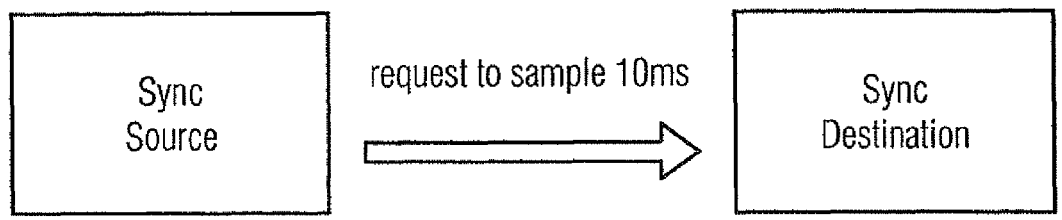
FIG. 10A to 10E show diagrams for illustrating a possible embodiment for generating a latency time stamp as employed by the digital multimedia network according to the present invention.

After trying to determine a "round trip pin time" to determine a latency of an appropriate data signal path a sending apparatus (sync source), orders the receiving apparatuses (sync destination) through this appropriate data path, e.g. an asynchronous data path, to start sampling the media data stream for a short while and to time stamp those data samples with their local time as shown in FIG. 10A. In FIG. 10A a source apparatus sends to a receiving synchronization destination apparatus, for example over an asynchronous data path a request to sample a data stream for the next 10 ms.

After all apparatuses have stopped sampling the source apparatus, i.e. the sync source sends a small recognizable fraction (stream pattern) of the stream data sample it has stored together with its local time stamp LTS to the receiving apparatuses (sync destination).

Figure 10B:
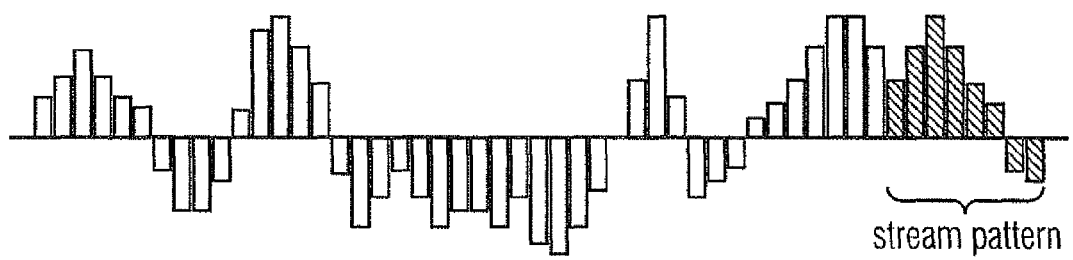
Figure 10C:
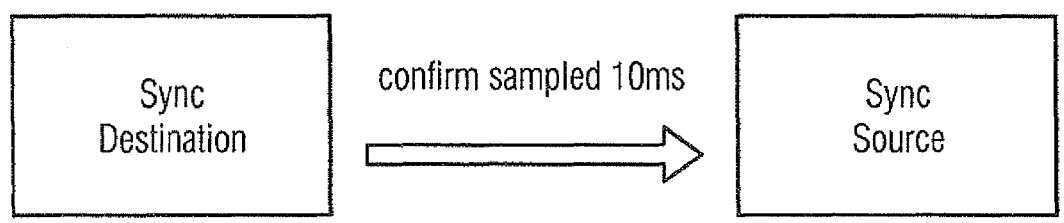
Figure 10D:
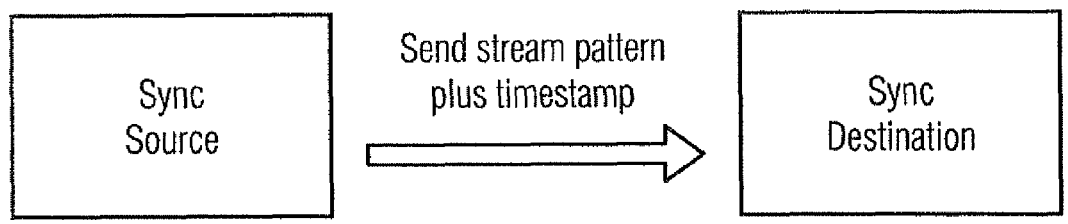
Figure 10E:
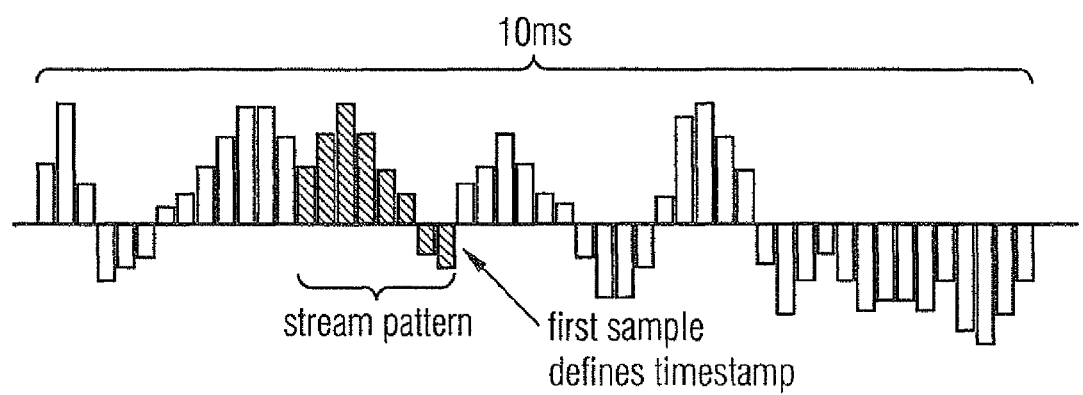

As indicated in FIG. 10B, the sync source apparatus itself takes a small part of the sample as a stream pattern and timestamps it. A synchronization destination apparatus confirms e.g. 10 ms sampling as requested and timestamps the first data sample of the sample pattern within the multimedia data stream as indicated by FIG. 10C. A synchronization source apparatus sends the stream pattern and its timestamps to the destination apparatus as indicated in FIG. 10D. The receiving apparatuses 5 search for the stream pattern within the sample they took and after they found it compare the timestamp received with the pattern to the timestamp done by them and calculate the offset.

In a running system, in a possible embodiment, a recalibration is performed in intervals of given time. In a possible embodiment a recalibration is done in a way that after the first successful calibration, apparatuses agree that every, e.g. 100.000.000 samples some data samples are sampled to memory and sent with the sample count from the source apparatus to the destination apparatus. Both the sample count and the sample itself then have to fit and prove that both apparatuses are still in synchronization with each other.

The digital multimedia network 1 according to the present invention can comprise any kind of multimedia apparatuses 5 such as analog to digital converters, digital to analog converters, mixing apparatuses, digital signal processors and command modifiers.

The invention claimed is:

1. A digital multimedia network with latency control comprising:
   apparatuses for processing of isochronous data streams,
   wherein a borderline input apparatus providing a data stream generates a latency time stamp which contains an absolute time indicating a creation time of said isochronous data streams and an accumulated delay time which is updated by each apparatus processing said isochronous data streams,
   wherein said latency time stamp of said isochronous data stream is evaluated by a borderline output apparatus of said network which synchronizes said isochronous data stream by delaying said isochronous data streams depending on their evaluated time stamps,
   wherein said isochronous data stream comprises data sequences each having a sequence-ID which indicates a source apparatus which provides said data sequence, wherein each data sequence further comprises a single or multi sequence marker which indicates whether the corresponding data sequence is a single data sequence provided by a single source apparatus or a multi data sequence provided by multiple source apparatuses, and
   wherein the processing apparatus comprises a mixing apparatus which delays all received data sequences to be mixed to match the slowest received data sequence according to the accumulated delay times of the respective data sequences and mixes then the received data sequences to generate a mixed data sequence.

2. The digital multimedia network according to claim 1, wherein the borderline input apparatus which provides a data stream sequence adds the data sequence-ID and the simple or multi sequence marker of said data stream sequence and a latency time stamp to a respective data stream sequence or to a parallel sequence within the isochronous data stream having a fixed phase relation with said data stream sequence.

3. The digital multimedia network according to claim 1, wherein each apparatus of said network which processes an isochronous data stream updates the latency time stamp of said isochronous data stream by adding a delay time caused by performing said processing.

4. The digital multimedia network according to claim 1, wherein the accumulated delay time of the isochronous data stream is indicated by a counter value.

5. The digital multimedia network according to claim 4, wherein the counter value indicating the accumulated delay time of the latency time stamp is incremented by a processing apparatus for updating said accumulated delay time every time when a processing time corresponding to a sample time of said data stream has passed.

6. The digital multimedia network according to claim 1, wherein the latency time stamp for an isochronous data stream is generated by injecting a data pattern into said data stream as an absolute time indication.

7. The digital multimedia network according to claim 6, wherein said injected data pattern comprises a predetermined data pattern or an altered, muted or erased data block of said data stream.

8. The digital multimedia network according to claim 1, wherein a latency time stamp for an isochronous data stream is generated by data stream pattern marking.

9. The digital multimedia network according to claim 1, wherein said borderline input apparatus comprises an analog-digital converter converting an analogue signal into a digital data stream.

10. The digital multimedia network according to claim 1, wherein said borderline input apparatus comprises a reading apparatus reading a digital data stream from a data carrier.

11. The digital multimedia network according to claim 1, wherein the isochronous data stream is a multimedia data stream comprising a continuous audio or video data stream.

12. The digital multimedia network according to claim 1, wherein said borderline output apparatus comprises a digital-to-analogue converter which converts the data stream into an analogue audio or video signal.

13. The digital multimedia network according to claim 1, wherein said data stream mixing apparatus creates a sequence-ID for the generated mixed data sequence, sets the multi sequence marker of the generated mixed data sequence to multi and updates the latency time stamp of the generated mixed data sequence depending on the processing time of said mixing apparatus.

14. The digital multimedia network according to claim 1, wherein a borderline output apparatus provided for outputting a data stream requests the latency time stamps of all other data streams to be output by other borderline output apparatuses of said network in a synchronized manner and delays the respective data stream depending on the returned latency time stamps.

15. The digital multimedia network according to claim 1, wherein said latency time stamp forms a device parameter of an apparatus in said network provided for processing or outputting a data stream comprising said latency time stamp.

16. The digital multimedia network according to claim 1, wherein said digital multimedia network comprises apparatuses which communicate with each other according to a hierarchical control protocol comprising command messages each having a hierarchical parameter address which consists of parameter grouping identifiers each corresponding to a hierarchical level of a predetermined tree-structured parameter hierarchy used for addressing device parameters throughout said digital multimedia network.

17. The digital multimedia network according to claim 16, wherein each apparatus comprises at least one control device having a processor for processing an XFN stack.

18. A method for synchronizing isochronous data streams in a digital multimedia network comprising:
- generating a latency time stamp for each isochronous data stream, by a borderline input apparatus providing said isochronous data stream wherein said latency time stamp contains an absolute time indicating a creation time of said isochronous data stream and an accumulated delay time which is updated by each apparatus of said network processing said isochronous data streams; and
- delaying isochronous data streams by borderline output apparatuses depending on their evaluated latency time stamps to synchronize these data streams with each other,
- wherein said isochronous data stream comprises data sequences each having a sequence-ID which indicates a source apparatus which provides said data sequence, wherein each data sequence further comprises a single or multi sequence marker which indicates whether the corresponding data sequence is a single data sequence provided by a single source apparatus or a multi data sequence provided by multiple source apparatuses,
- wherein all received data sequences to be mixed by a mixing apparatus are delayed to match the slowest received data sequence according to the accumulated delay times of the respective data sequences and then mixed to generate a mixed data sequence.

19. The method according to claim 18, wherein said latency time stamps of said isochronous data streams are evaluated by a data stream mixing apparatus of said network to synchronize the isochronous data streams to be mixed.

20. The method according to claim 18, wherein said latency time stamps of said isochronous data streams are evaluated by at least two borderline output apparatuses of said network which output said data streams synchronously.

21. The method according to claim 18, wherein said latency time stamp of the isochronous data stream is generated by a borderline input apparatus providing said data stream.

22. The method according to claim 18, wherein said latency time stamp is generated by injecting a data pattern into said isochronous data stream as an absolute time indication.

23. The method according to claim 18, wherein said latency time stamp is generated by data stream pattern marking.

24. A non-transitory data carrier comprising a computer program for synchronizing isochronous data streams in a digital multimedia network comprising:
- generating a latency time stamp for each isochronous data stream by a borderline input apparatus providing said isochronous data stream,
- wherein said latency time stamp contains an absolute time indicating a creation time of said isochronous data stream and an accumulated delay time which is updated by each apparatus of said network processing said isochronous data stream, and
- delaying isochronous data streams by borderline output apparatuses depending on their evaluated latency time stamps to synchronize these isochronous data streams with each other, wherein said isochronous data stream comprises data sequences each having a sequence-ID which indicates a source apparatus which provides said data sequence, wherein each data sequence further comprises a single or multi sequence marker which indicates whether the corresponding data sequence is a single data sequence provided by a single source apparatus or a multi data sequence provided by multiple source apparatuses,
- wherein all received data sequences to be mixed by a mixing apparatus are delayed to match the slowest received data sequence according to the accumulated delay times of the respective data sequences and then mixed to generate a mixed data sequence.

\* \* \* \* \*

UNITED STATES PATENT AND TRADEMARK OFFICE
CERTIFICATE OF CORRECTION

PATENT NO.       : 8,477,812 B2                                                         Page 1 of 1
APPLICATION NO. : 12/681208
DATED            : July 2, 2013
INVENTOR(S)      : Gurdan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 469 days.

Signed and Sealed this

Eighth Day of September, 2015

Michelle K. Lee
*Director of the United States Patent and Trademark Office*